United States Patent [19]

Jensen

[11] Patent Number: 4,864,859
[45] Date of Patent: Sep. 12, 1989

[54] METHOD FOR DYNAMICALLY BALANCING A MECHANISM HAVING A HIGH SPEED ROTATING COMPONENT

[75] Inventor: Lloyd B. Jensen, Gardena, Calif.

[73] Assignee: Allied-Signal Inc., Morristown, N.J.

[21] Appl. No.: 223,301

[22] Filed: Jul. 25, 1988

[51] Int. Cl.$^4$ ............................................ G01M 1/168
[52] U.S. Cl. ........................................................ 73/473
[58] Field of Search ................ 73/460, 462, 472, 473, 73/474, 475, 476, 477, 478, 479, 471

[56] References Cited

U.S. PATENT DOCUMENTS

| | | | |
|---|---|---|---|
| 4,619,142 | 10/1986 | Gisler | 73/462 |
| 4,196,629 | 4/1980 | Philips | 73/462 |
| 4,238,960 | 12/1980 | Curtis et al. | 73/462 |
| 4,495,811 | 1/1985 | Müller et al. | 73/462 |
| 4,509,367 | 4/1985 | McInturff et al. | 73/457 |
| 4,608,650 | 8/1986 | Kapadia | 73/462 |

FOREIGN PATENT DOCUMENTS

| | | | |
|---|---|---|---|
| 0047708 | 8/1977 | U.S.S.R. | 73/471 |
| 0048103 | 3/1981 | U.S.S.R. | 73/471 |

*Primary Examiner*—John Chapman
*Assistant Examiner*—Michele Simons
*Attorney, Agent, or Firm*—Ken C. Decker; William N. Antonis

[57] ABSTRACT

A method for balancing turbochargers or other high speed rotating equipment in which relatively large masses require balancing in two axially separated planes includes the steps of mounting the mechanism to be balanced in a test fixture so that the mechanism can move in a substantially unrestrained manner in any of the three spatial dimensions. Accelerometers adjacent opposite ends of the rotating component measure maximum acceleration of the housing due to vibration. Since the housing substantially unrestrained, the measurement of vibration at any end of the device will be influenced by vibrations induced by the mass at the other end of the device, since the mechanism is not otherwise damped by supporting structures. An optical sensor measures phase angle, and this information along with the information generated by the accelerometers is fed to a conventional vibratory analysis device to determine the unbalance of the rotating component.

17 Claims, 4 Drawing Sheets

METHOD FOR DYNAMICALLY BALANCING A MECHANISM HAVING A HIGH SPEED ROTATING COMPONENT

This invention relates to a method for dynamically balancing mechanisms which include a high speed rotating component, such as turbochargers or other turbomachinery.

Exhaust gas driven turbochargers include a housing which supports a shaft for high speed rotation. A compressor wheel is mounted on one end of the shaft, and a turbine wheel is mounted on the other end of the shaft. When the turbocharger is installed on an internal combustion engine, exhaust gases drive the turbine wheel which in turn rotates the compressor wheel. Since the rotating component of a turbocharger rotates at an extremely high speed (often in excess of 100,000 RPM), it is necessary, in order to reduce noise to an acceptable level and to assure a satisfactory operating life for the turbocharger, to make sure that rotating component is dynamically balanced. Since the turbocharger includes relatively large rotating masses on opposite ends of the shaft, it is necessary to balance both ends of the rotating component. Heretofore, this was done by separately balancing both the compressor wheel end of the shaft and the turbine wheel end of the shaft. This so-called two plane balance requirement has proven in practice to be quite difficult to accomplish, since the damping introduced by the fixed support and the effect of unbalance on the opposite end of the shaft when balancing one end of the shaft made the procedure essentially an iterative process. Accordingly, in order to make dynamic balance possible, it was necessary to use more expensive, higher grade bearings and to reduce tolerances on the rotating components, both of which introduced increased cost. More recently, it has been proposed to use ball bearings to support the rotary components of the turbocharger. The viscous dampening of the ball bearings makes balance of the turbocharger even more difficult.

The present invention permits turbochargers and other rotating turbomachinery to be consistently balanced at operating speeds. This is accomplished by soft-mounting the turbocharger center housing. That is, the turbocharger is mounted so that its movement is substantially unrestrained in all three spatial dimensions, even through, of course, some restraint is necessary in order to restrain the turbocharger. However, this restraint is an insignificant fraction of the restraint imposed by the prior art hard-mounting system, and also is an insignificant fraction of the damping provided by the permanent mounting of the turbocharger on, for example, a vehicle engine. Use of accelerometers instead of displacement sensors and other shaft motion detectors used in prior art methods permits balance in two planes simultaneously, and makes vibration and phase data used in balancing independent of frequency for improved accuracy of measurement.

Accordingly, the balance of the final turbocharger assembly is more closely controlled and noise due to vibration is minimized. Furthermore, the final balance procedure can compensate for manufacturing variations due to the improved accuracy of the balance achieved over prior art methods. Accordingly, it is possible to correct manufacturing inaccuracies after final assembly of the rotating components, thereby permitting substantial reduction in manufacturing cost due to the fact the close tolerances required in prior art turbochargers may be significantly relaxed. Furthermore, the bearings do not have to be as accurate as in prior art turbochargers in order to withstand the vibration inherent in such equipment even after balancing by prior art methods, so that less expensive bearings may be used.

These and other advantages of the present invention will become apparent from the following description, with reference to the accompanying drawings, in which.

Figure 1:
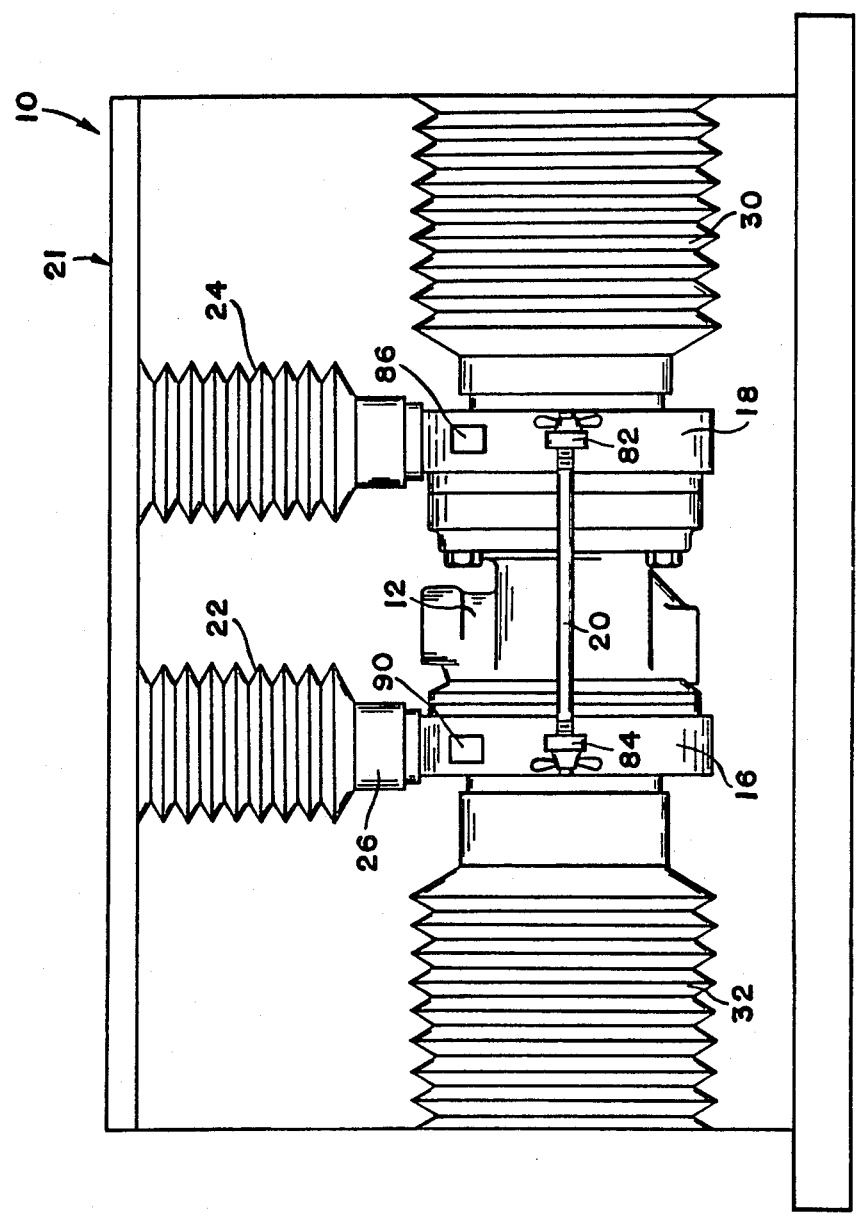
FIG. 1 is a diagrammatic illustration of the balancing fixture used to perform the method of the present invention, shown with a turbocharger center housing which is to be dynamically balanced installed in the fixture.
Figure 2:
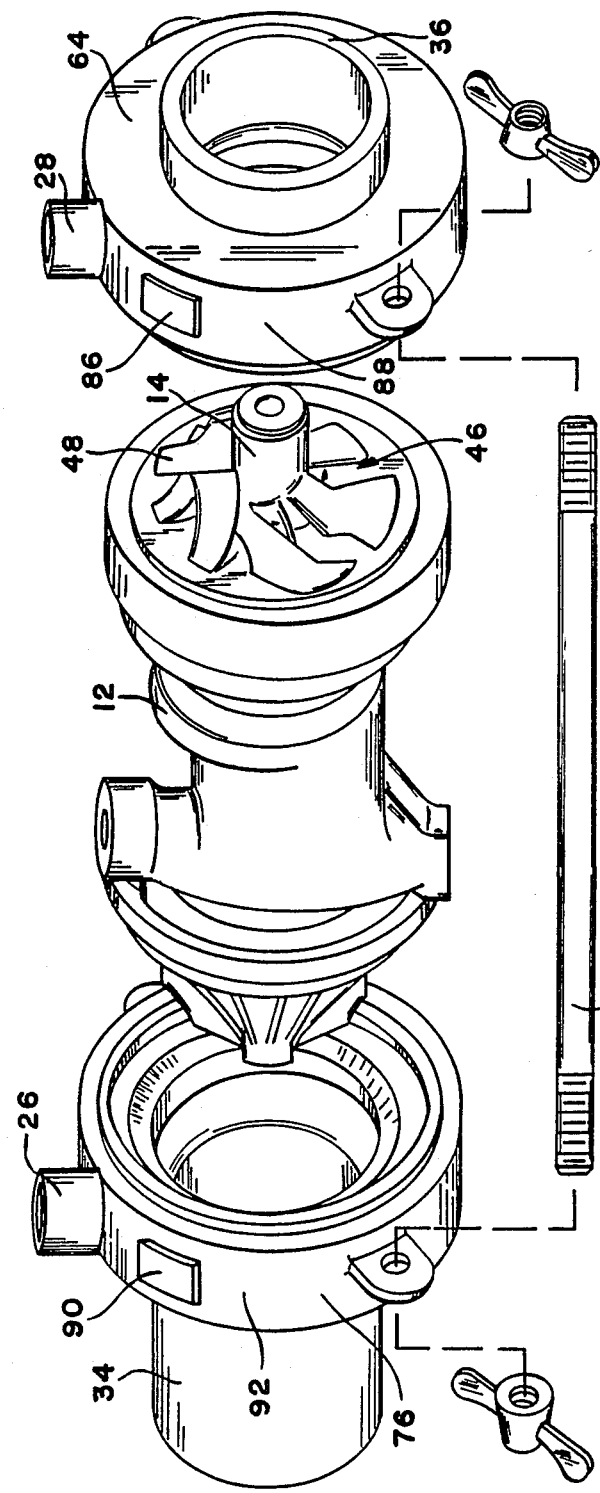
FIG. 2 is an exploded perspective view illustrating the turbocharger centerhousing to be dynamically balanced and the housing engaging portions of the fixture illustrated in FIG. 1.
Figure 3:
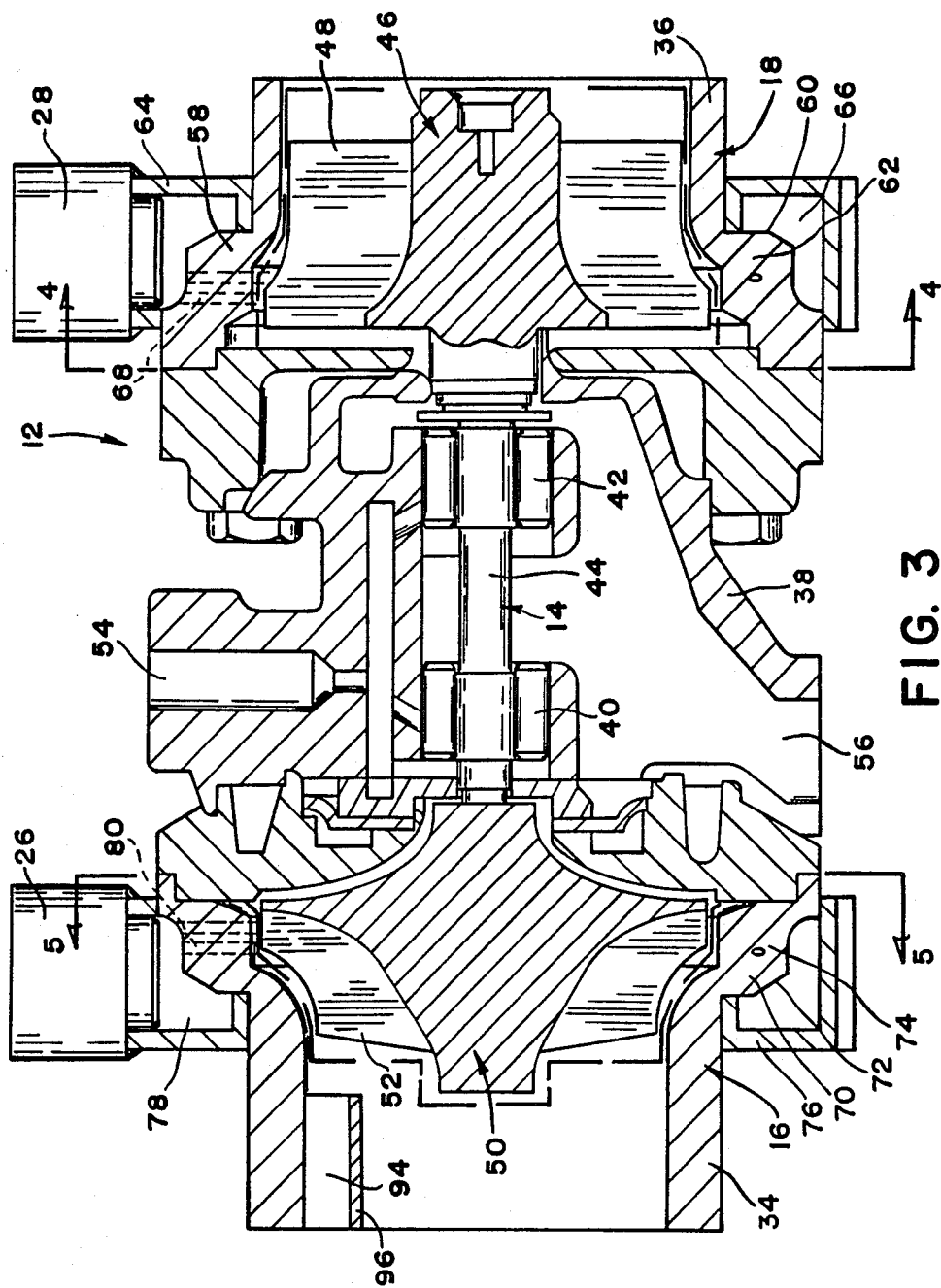
FIG. 3 is a longitudinal cross-sectional view of a turbocharger center housing with the housing engaging portions of the balancing fixture installed thereon.

Referring now to the drawings, and especially FIGS. 1-3 thereof, a balancing fixture used to perform the method of the present invention as indicated at 10 in FIG. 1. The fixture 10 is used to balance the rotating component of a mechanism 12 which contains a rotating component generally indicated at 14 (FIG. 3). The mechanism 12 may be a center housing assembly of, for example, an automotive exhaust gas driven turbocharger, but the present method is not limited to balancing exhaust gas driven turbochargers. The present method may also be used for dynamically balancing any high speed rotating machinery, such as turbomachinery other than turbochargers. The fixture 10 includes housing engaging portions 16, 18 which are clamped to each other by a tie rod 20 which also clamps the housing engaging portion 16, 18 against opposite ends of the turbocharger centerhousing 12. The fixture 10 further includes a frame 21 from which flexible bellows conduits 22, 24 extend. The flexible conduits 22, 24 are suspended from the frame 21 and engage inlet adapters 26, 28 carried by the housing engaging portions 16, 18. Similar flexible conduits 30, 32 are connected to outlet adapters 34, 36 of the housing engaging portions 16, 18, as will be hereinafter described.

Referring now to FIG. 3, the mechanism 12 includes a housing 38 which rotatably supports the rotating component 14 through axially spaced bearings 40, 42. Rotating component 14 includes a shaft 44 which is supported by the bearings 40, 42. A turbine wheel 46, including turbine blades 48, is mounted on one end of the shaft 44, and a compressor wheel 50, including compressor blades 52, is mounted on the opposite end of the shaft 42. As is well known to those skilled in the art, when the turbocharger mechanism 12 is used, the housing engaging portions 16, 18 are replaced by a compressor housing (not shown) and a turbine housing (not shown) respectively. These housing communicate exhaust gas into and from the turbine blades 48, communicate ambient air to the compressor blades 52, and communicate compressed air from the turbine blades 48. The energy in the engine exhaust gases passing through the blades 48 rotate the shaft 44, thereby rotating compressor wheel 50 to compress inlet air which is used to charge the air induction system of the vehicle. Since the shaft 44 rotates at extremely high speeds (in excess of 100,000 RPM), it is essential that the rotating component 14 be dynamically balanced, to prevent excessive noise and to prevent excessive vibration from damaging the components, including the bearings 40, 42. It is also necessary to communicate engine lubricating oil to the bearings 40, 42. This is done by passing oil into an oil inlet 54, through the bearings 40, 42, and out through an outlet 56. Since, as will be hereinafter described, it is necessary during the balancing operation to accelerate the rotating component 14 to substantially normal operating speeds, it is also necessary to communicate oil to the bearings 40, 42 during balancing. Accordingly, the fixture 10 includes means (not shown) for communicating lubricating oil to and from the oil inlet port 54 and sump 56.

Figure 4:
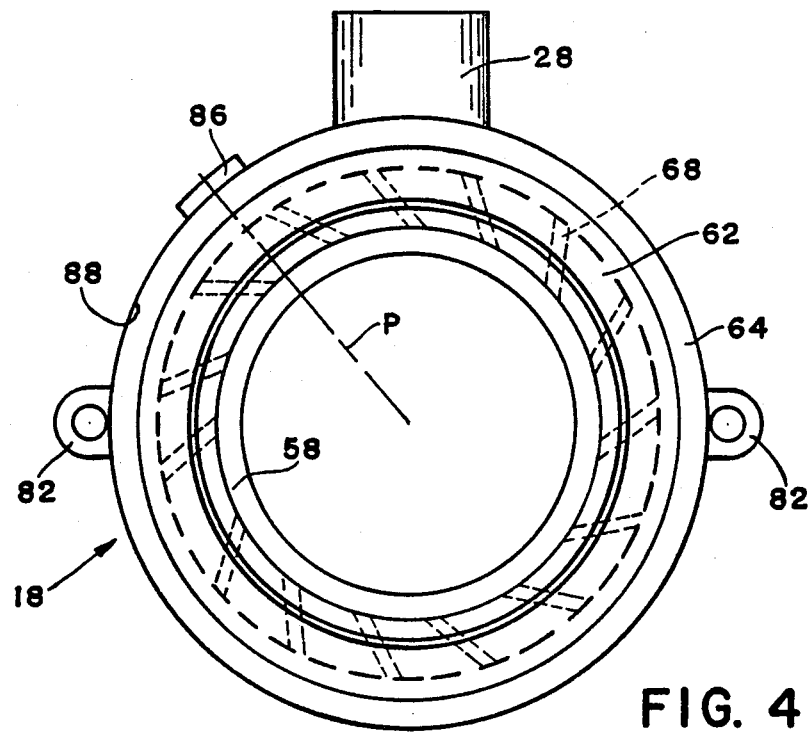
FIG. 4 is a view taken substantially along lines 4—4 of FIG. 3.
Figure 5:
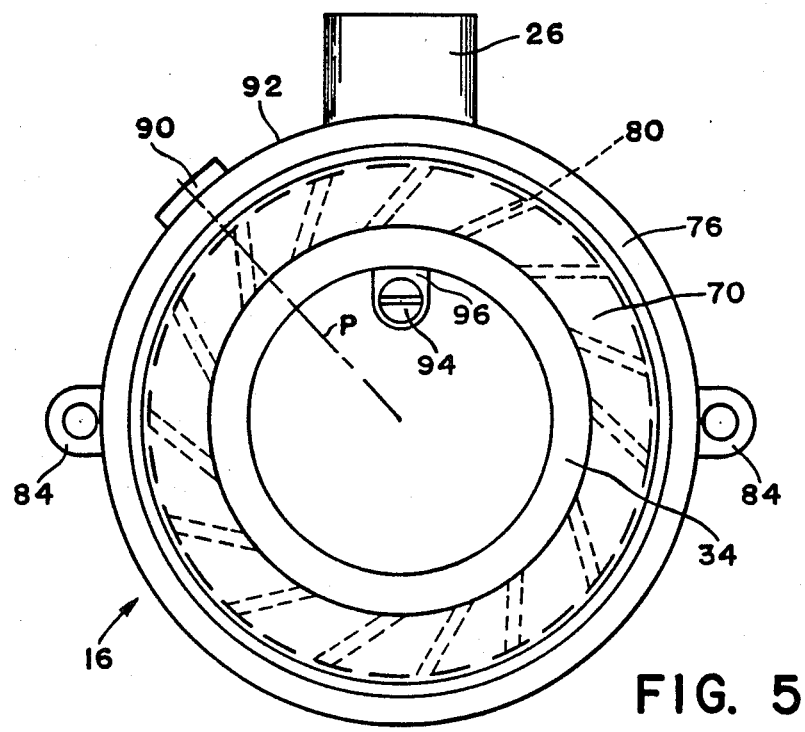
FIG. 5 is a view taken substantially along lines 5—5 of FIG. 3.

Housing engaging portion 18, includes a turbine nozzle 58 having an outer circumferential surface 60 defined by a circumferentially extending wall 62. The surface 60 of wall 62 blends into an axially extending portion which defines the outlet adapter 36. A support connector 64 is slidably received on the outlet adapter 36. Support connector 64 sealingly engages corresponding portions of the circumferentially extending surface 60 of the outer circumferential surface of the outlet adapter 36 to define a chamber 66 between the circumferentially extending surface 60 and the support connector 64. The inlet adapter 28 extends from the support connector 64 and communicates with the chamber 66 to communicate compressed air into the latter. A series of angled apertures 68 extend through the wall 62 of the turbine nozzle 58 to communicate compressed air from the chamber 66 to the blades 48 of the turbine wheel 46. As can best be seen in FIG. 4, the angled apertures 68 extend through the wall 62 at oblique angles, so the compressed air is directed onto the turbine blades 48 at the proper angle. The chamber 66 communicates with a source of compressed air (not shown) through the inlet adapter 28 and the bellows conduit 24. Compressed air, after passig through the turbine blades 48, is led away from the housing engaging portion 18 through the outlet adapter 36 and the flexible bellows conduit 32.

The housing engaging portion 16, which engages the end of the housing 38 of turbocharger mechanism 12 adjacent the compressor wheel 50, consists of a compressor nozzle assembly 70, which has an outer circumferential surface 72 defined on circumferentially extending wall 74 which cooperates with compressor support connector 76 to define a chamber 78 therebetween. Angled apertures 80 communicate the chamber with the compressor blades 52. The angle apertures 80 are similar to the angle apertures 68. Air is pumped into the chamber 78 through the inlet adapter 26 and the bellows conduit 22. Although during normal operation of a turbocharger the compressor wheel pump air, by pumping air into the compressor wheel, the compressor wheel is unloaded during dynamic balancing, thereby preventing unnecessary wear and preventing temperature increase due to compression of the air during balancing. The compressed air is exhausted from the compressor wheel 50 through outlet adapter 34 and bellows conduit 32.

Each of the support connectors 64, 76 are provided with radially projecting ears 82, 84 through which tie rods 21 extend to clamp the turbine nozzle 58 and compressor nozzle assembly 70 into fluid-tight engagement with the housing 38. A conventional circumferentially extending sealing material is applied to the face of the nozzle assemblies 58, 70 to assure fluid-tight engagement with the housing 38. The ears 82, 84 and tie rods 21 also assure proper angular orientation of the housing engaging portions 16, 18 with respect to one another. A conventional accelerometer 86 is mounted on the outer circumferential surface of the turbine support connector 64, and an identical accelerometer 90 is mounted on the outer circumferential surface 92 defined by the compressor support connector 76. The accelerometers 86, 90 must be oriented so that they have the same angular orientation with respect to the rotating component 14, so that they are centered on substantially the same radially projecting plane P extending radially from the center line of the shaft 44. The orientation of the accelerometers in substantially the same radial plane assures that vibrations of the housing induced by the rotating component are measured in substantially the same phase.

The phase angle at which maximum vibrations are sensed by the accelerometers 86, 90 is measured by an optical sensor 94 mounted in a carrier 96 on the compressor nozzle assembly 70. As can be seen, the sensor 94 is presented an unobstructed view of the compressor blades 52 and is capable of measuring phase angles from a predetermined reference angle. The predetermined reference angle may be conventionally established by applying a radially extending line on the tip of one of the compressor blades. The optical sensor 94, of course, will be axially offset from the end 96 of the compressor blades.

As discussed above, an important feature of the invention is that the turbocharger mechanism 12 is supported by the bellows conduits 22, 24. While the bellows conduits 22, 24 and 30, 32 do provide a minimal amount of damping of the turbocharger mechanism 12, the damping provided by the bellows conduits 22, 24 and 30, 32 which are flexible and only stiff enough to support the weight of the mechanism 12, will be only a small fraction of the heavy support mechanisms in which the housing 12 is inflexibly secured in the prior art devices, and will also be only a small fraction of the damping provided by the vehicle internal combustion engine or other mount upon which the mechanism 12 eventually will be installed. The mechanism 12 may be supported in any manner besides using the bellows 22, 24 and 30, 32 which will provide minimum damping to the mechanism 12. Accordingly, the mechanism 12, during balancing, will be substantially unrestrained against movement in any of the three spatial dimensions. Since vibrations induced by the mass accounted for by both the turbine wheel 48 and the compressor wheel 50 will differ, balancing will require removal or addition of different amount of masses to both ends of the shaft 44.

During balancing, the rotary component 14 is accelerated to substantially normal operating speeds by forcing air through the bellows conduit 24 and into the turbine blades 48. Rotation of the rotary component 14, if there is an imbalance on either end of the shaft 44 will induce movement of the housing 12, since, as discussed above, the mechanism 12 is substantially unrestrained against movement in any direction. Movement of the end of the shaft 44, upon which the turbine wheel 48 is mounted will be sensed by the accelerometer 86, and movement of the other end of the housing within which the compressor wheel 50 is mounted will be sensed by the accelerometer 90. Of course, the accelerations of the housing 38 detected by both accelerometers will be influenced primarily by imbalances in the wheels 48, 50 adjacent the corresponding accelerometer 86 or 90, but these measurements will also be influenced by vibrations induced at the opposite end of the shaft 44 and transmitted through the shaft or the housing. Accordingly, balancing of either end of the shaft 44 will take into account imbalances induced by rotation of the mass at the opposite end of the shaft.

The signals generated by the accelerometers 86, 90, and the signal from the optical sensor 94, are fed to conventional vibratory analysis device, such as a device sold under the trade name "Vibroport 30" by Schenck-Trebel AG, a company of the Federal Republic of Germany. This device measures the maximum accelerations measured by the accelerometer during rotation of the device, and determines the phase angle from the optical sensor 94 when these maximum accelerations occur. The machine then calculates, using the measurements from the accelerometer 86 and optical sensor 94, the amount of material that must be removed the end of the shaft 44 upon which the turbine wheel is mounted and the phase angle at which the material must be removed. The device also calculates, by using the measurement from the accelerometer 90 and the phase angle information provided by the optical sensor 94, the amount of material which must be removed from the end of the shaft 44 on which the compressor wheel 50 is mounted, and the phase angle at which this material must be removed. Using this information, an operator may remove the material, and thus achieve balance of the rotating component 14, it being noted that, since the accelerometers adjacent each end of the shaft also measure the influence on that end of the shaft by vibrations induced at the other end of the shaft, that such measurements can provide complete balancing information without the iterative processes required in the prior art.

I claim:

1. Method for dynamically balancing a mechanism having a high speed rotating component before mounting the mechanism upon a permanent support, said mechanism having a housing, said rotating component being mounted for rotation in said housing, said method comprising the steps of mounting the mechanism in a fixture for substantially unrestrained movement in all three spatial dimensions, accelerating said rotating component to substantially normal operating speeds while the mechanism is mounted in the fixture, measuring the maximum acceleration of the housing while the component is rotating at said substantially normal operating speed, measuring the phase angle of said rotating component from a predetermined reference angle when said maximum acceleration occurs, and using the measured maximum acceleration and phase angle to calculate the change in mass of said rotating component necessary to balance said mechanism.

2. Method for dynamically balancing a mechanism as claimed in claim 1, wherein measurement of the acceleration of said housing is effected by mounting an accelerometer adjacent said component.

3. Method for dynamically balancing a mechanism as claimed in claim 2, wherein said accelerometer is mounted radially outwardly from said component.

4. Method for dynamically balancing a mechanism as claimed in claim 1, wherein said rotating component includes a shaft mounted in said housing and a pair of masses mounted on said shaft spaced axially along said shaft from one another, said method including the step of mounting a first accelerometer adjacent one of said masses and mounting a second accelerometer adjacent the other mass, and recording the maximum acceleration measured by each of said accelerometers and phase angles of said rotating component when said maximum accelerations are measured.

5. Method for dynamically balancing a mechanism as claimed in claim 4, wherein each of said accelerometers is mounted on said housing radially outwardly from its corresponding mass.

6. Method for dynamically balancing a mechanism as claimed in claim 5, wherein said accelerometers are mounted centered on a substantially common radial plane with respect to said shaft.

7. Method for dynamically balancing a mechanism as claimed in claim 6, wherein one of said masses is a turbine wheel mounted on said shaft and the other mass is a compressor wheel mounted on said shaft, said fixture having housing engaging portions having turbine inlet and outlet ports and compressor inlet and outlet ports, said rotating component being accelerated to substantially normal operating speeds by forcing air through the turbine wheel.

8. Method for dynamically balancing a mechanism as claimed in claim 7, wherein flexible conduits are connected to at least one of said ports to communicate air to and from said mechanism, said mechanism being supported solely by said conduits.

9. Method for dynamically balancing a mechanism as claimed in claim 7, wherein said method includes the step of limiting the damping forces exerted on said mechanism during balancing to a magnitude substantially less than the damping forces which are exerted on said mechanism by said permanent support after the mechanism is mounted on the permanent support.

10. Method for dynamically balancing a mechanism as claimed in claim 7, wherein said phase angle is measured by a sensor mounted in one of said housing engaging portions axially offset from one of said wheels.

11. Method for dynamically balancing a mechanism as claimed in claim 4, wherein said method includes the step of limiting the damping forces exerted on said mechanism during balancing to a magnitude substantially less than the damping forces which are exerted on said mechanism by said permanent support after the mechanism is mounted on the permanent support.

12. Method for dynamically balancing a mechanism as claimed in claim 11, wherein said rotating component is accelerated by pumping air through one of said masses.

13. Method for dynamically balancing a mechanism as claimed in claim 12, wherein the air used to accelerate said rotating component is pumped through flexible conduits attached to said housing, said conduits supporting said housing to permit the substantially unrestrained movement of the latter in all three spatial dimensions.

14. Method for dynamically balancing a mechanism having a high speed rotating component before mounting the mechanism upon a permanent support, said mechanism having a housing, said rotating component having an axis and being mounted for rotation in said housing, said method comprising the steps of measuring the maximum accelerations of the housing in predetermined planes spaced axially from one another along the axis of the rotating component while the component is rotating at substantially normal operating speed, measuring the phase angle of said rotating component from a predetermined reference angle when said maximum accelerations occur, using the measured maximum accelerations and phase angles to calculate the change in mass of said rotating component necessary to balance said mechanism, and limiting the damping forces exerted on said mechanism during balancing to a magnitude substantially less than the damping forces which are exerted on said mechanism by said permanent support after the mechanism is mounted on the permanent support.

15. Method for dynamically balancing a mechanism as claimed in claim 14, wherein said accelerations are measured by accelerometers spaced axially from one another along the axis of the rotating component.

16. Method for dynamically balancing a mechanism as claimed in claim 15, wherein said accelerometers are mounted centered on a substantially common radial plane with respect to said rotating component.

17. Method for dynamically balancing a mechanism as claimed in claim 14, wherein wherein said rotating component includes a shaft mounted for rotation within said housing, and a compressor wheel and a turbine wheel mounted on said shaft axially offset from one another, said rotating component being accelerated by forcing air through the turbine wheel.

* * * * *